No. 666,518. Patented Jan. 22, 1901.
P. GUTTON.
PROCESS OF PRODUCING WEAVING DIAGRAMS.
(Application filed Apr. 18, 1900.)
(No Model.) 3 Sheets—Sheet 1.

Witnesses
Geo. E. Sullivan.
Dennis Dumby.

Inventor
Pierre Gutton
By James L. Norris
Atty

No. 666,518. Patented Jan. 22, 1901.
P. GUTTON.
PROCESS OF PRODUCING WEAVING DIAGRAMS.
(Application filed Apr. 18, 1900.)
(No Model.) 3 Sheets—Sheet 2.

Witnesses:
Geo. E. Sullivan
Dennis Dumby

Inventor
Pierre Gutton
By James L. Norris
Atty.

No. 666,518. Patented Jan. 22, 1901.
P. GUTTON.
PROCESS OF PRODUCING WEAVING DIAGRAMS.
(Application filed Apr. 18, 1900.)

(No Model.) 3 Sheets—Sheet 3.

Witnesses:
Geo. E. Sullivan.
Dennis Sumby.

Inventor
Pierre Gutton
By James L. Norris
Atty.

UNITED STATES PATENT OFFICE.

PIERRE GUTTON, OF PARIS, FRANCE, ASSIGNOR TO THE SOCIÉTÉ DE DESSINS INDUSTRIELS, OF SAME PLACE.

PROCESS OF PRODUCING WEAVING-DIAGRAMS.

SPECIFICATION forming part of Letters Patent No. 666,518, dated January 22, 1901.

Application filed April 18, 1900. Serial No. 13,353. (No specimens.)

*To all whom it may concern:*

Be it known that I, PIERRE GUTTON, a citizen of the Republic of France, residing at 26 Avenue Carnot, Paris, France, have invented certain new and useful Improvements in Processes of Producing Weaving-Diagrams, of which the following is a specification.

This invention relates to improvements in the method of transferring design patterns or figures to cards such as used in Jacquard looms.

The principle of this invention or method is that embodied in my German Patent No. 73,152, having for its object to greatly simplify the photographic manipulations or operations by the employment of peculiarly contrived or constructed screens, as will be more fully hereinafter described, and pointed out by the claim. In the elucidation of these improvements I employ, as in my said German patent, the "8-satin" pattern and its derived patterns, together with the two glass plates or positives, duplicates of a suitably-ruled paper sheet, and the "8-satin" pattern configurated sheet or card, respectively.

Figure 1:
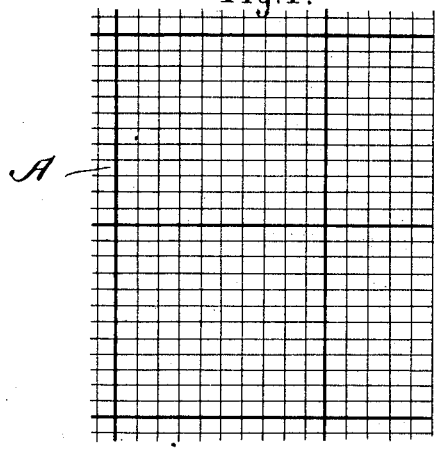
Figure 2:
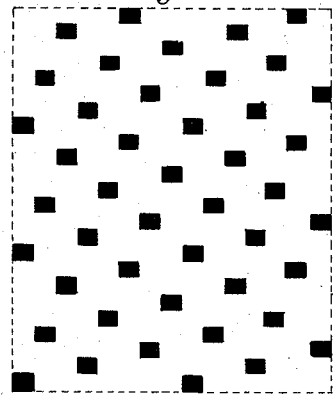
Figure 3:
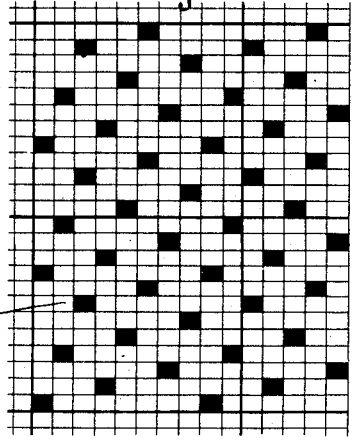
Figure 4:
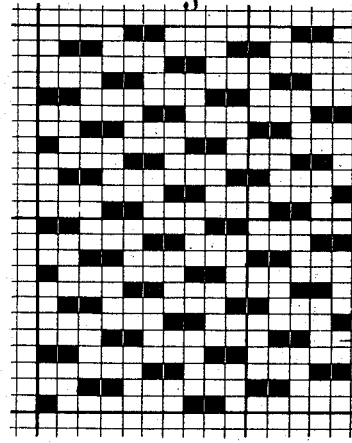
Figure 5:
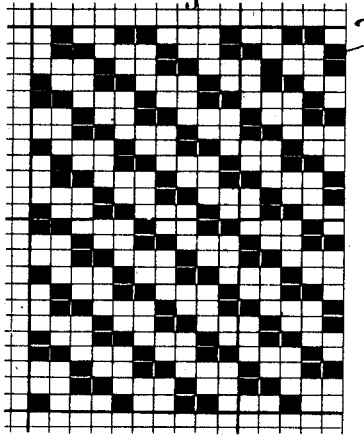
Figure 6:
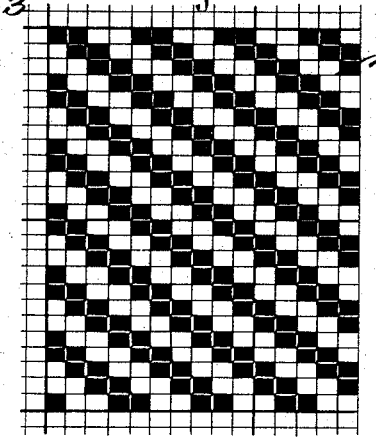
Figure 7:
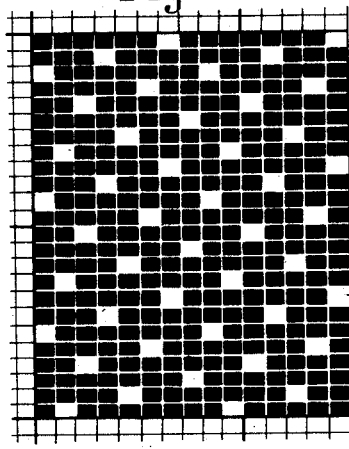
Figure 8:
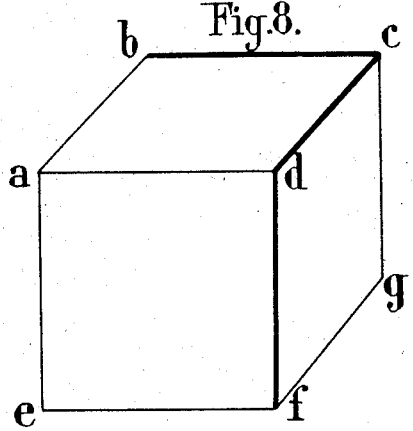
Figure 15:
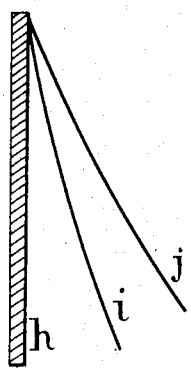

In the accompanying drawings, Figure 1 represented a paper sheet ruled into a multiplicity of squares. Fig. 2 represents a like sheet with a series of "8-satin" points pattern outlined thereon. Fig. 3 represents a superposed "projection" or negative of the conjoint representation of the sheets disclosed by Figs. 1 and 2. Figs. 4, 5, 6, and 7 represent various patterns produced by successive or numerous displacements and photographic-printing operations from the negative disclosed by Fig. 3 in connection with the parts illustrated by Figs. 1 and 2. Figs. 8, 9, 10, 11, 12, 13, and 14 represent a series of views of a cube or quadrangular figure embodying my invention; and Fig. 15 is a view of a screen, with films of a sensitized character assembled therewith, as employed in carrying out my invention, as will be more fully disclosed later on.

My improvements are based upon the following principles.

In considering the various patterns produced or derived from the same ground-patterns obtainable in accordance with the above-outlined procedure involving the parallel displacement of dots or "points" upon a suitably-ruled card or ground, together with successive photographic-printing operations or steps, it will be noted that such displacement is always effected in the same direction and that the patterns involving the greatest number of displacements and printing operations contain all the points of the preceding patterns. In other words, pattern $B^2$ contains all the points of pattern $B'$, pattern $B^3$ all the points of pattern $B^2$, pattern $B^4$ all the points of pattern $B^3$, and pattern $B^5$ all the points of patterns $B'$, $B^2$, $B^3$, and $B^4$.

Having selected a ground-pattern for a given card, all variations in the arrangement of the figures on the card dependent upon such ground-pattern are, as aforesaid, obtained by parallel displacement of the points of the card forming said ground-pattern.

Let it be supposed that in order to obtain the various light effects involved in a given design or pattern it is required to produce, say, "8 satin," as exemplified in Fig. 3, and the various patterns produced or derived therefrom, as in Figs. 4, 5, 6, and 7, I proceed as follows: Referring to the drawings, I suitably fix on a plate of glass (not shown) a sheet of paper A, ruled in squares. (See Fig. 1.) Over this is applied a sheet of unruled paper B, secured in place at its edges. By holding up this arrangement in the light, so as to be properly viewed, the ruled squares of the intermediate sheet A can be seen and the points of the "8-satin" pattern B', Fig. 3, be located. If the plain or unruled sheet B be then viewed by reflection, it will appear as shown in Fig. 2. A negative photographic impression of the sheet B, with said points noted thereon, is next taken. Now without shifting either the camera used in making this negative or the glass plate, to which the above-described sheet B is fixed, the ruled sheet A is uncovered, and of this also a photographic negative is taken. Thus for the purpose of pattern-card preparation the "8-satin" pattern is decomposed into two separable negatives, and by superposing projections of the two negatives upon a sensitized plate a pattern-card for "8-satin" on such plate, Fig. 3, is obtained, as at B'. These are all in accordance with the showing in my aforesaid German patent and also generally underlie the patterns B², B³, B⁴, and B⁵, disclosed by the other Figs. 4, 5, 6, and 7 of the drawings, respectively, as above intimated.

I will now describe the application of the foregoing to the reproduction of a right-lined figure, such as a cube $a\,b\,c\,d\,e\,f\,g$. (See Figs. 8, 9, 10, 11, 12, 13, and 14.) It will be supposed that for the side $a\,b\,c\,d$ the ground-pattern B' is adopted, for the side $a\,d\,e\,f$ the pattern B⁴, and for the side $c\,d\,f\,g$ the pattern B⁵.

Figure 9:
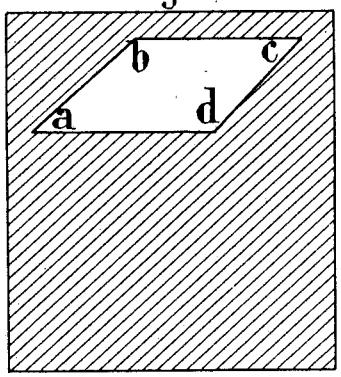
Figure 10:
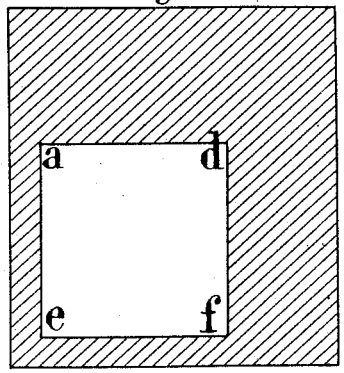
Figure 11:
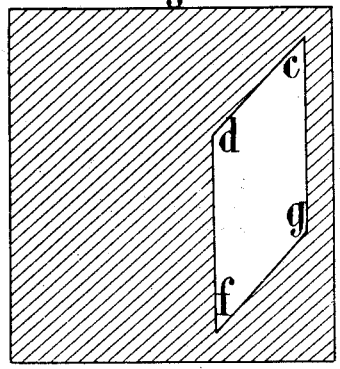
Figure 12:
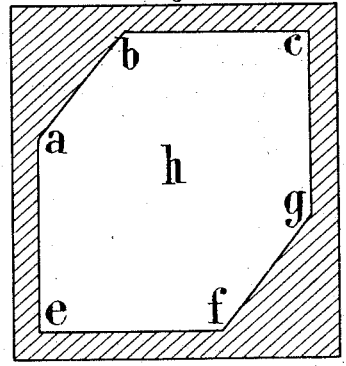
Figure 13:
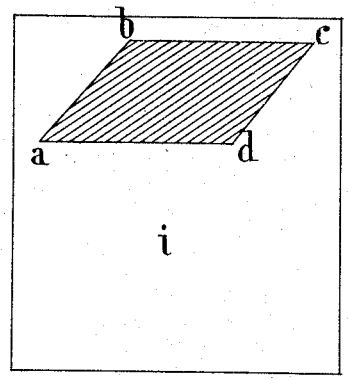
Figure 14:
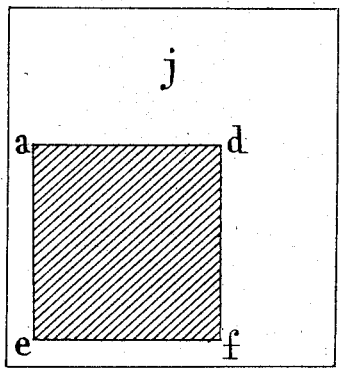

Instead of making separate glass screens for each side, as designed or represented in Figs. 9, 10, and 11, and then conducting for each such side the series of operations of transferring onto the corresponding pattern I proceed as follows: As already remarked, the pattern B⁵ contains all the points of the pattern B³, and this latter pattern contains all the points of the pattern B'. Consequently I may print on the whole surface of the cube the ground-pattern B', and for this purpose I make on a glass plate a screen $h$ of the form shown in Fig. 12, and by printing through this screen said ground-pattern B' the side $a\,b\,c\,d$ will be transferred onto card with the convenient pattern. The pattern B⁴ is designed for the side $a\,d\,e\,f$, and it comprises five successive displacement operations of the negative B with relation to the negative A and five photographic-printing operations; but all these printing operations are necessary of the side $c\,d\,e\,f$, upon which the pattern $f$ is to be transferred. In the transference of the pattern B⁵ to said side I take a film—such as $i$, Fig. 13—which I coat with a suitable coloring medium, so as to screen the figure or side $a\,b\,c\,d$. Then I place the said film before the screen $h$ and print the pattern B⁴ on the sides $a\,d\,e\,f$ and $e\,d\,f\,g$. It is remarked here that for effecting this printing operation—transferring to the sides $a\,d\,e\,f$ and $c\,d\,f\,g$—only four such operations instead of five are performed, one less than otherwise would be the case, as the points of pattern B' were previously printed thereon, also saving one shifting operation. The operation of completing the production of the impression on the side $c\,d\,f\,g$ is effected by leaving the film $i$ before the screen or support $h$ and turning down on said side another film $j$, screening only the side $a\,d\,e\,f$. It will be readily understood that by this operation the side $c\,d\,f\,g$ only remains uncovered and that as the said side $c\,d\,f\,g$ had already received six impressions it requires only one impression for the completion of the operations.

Further, let it be supposed that a design comprises the transferring to a card of a ground-pattern and a suitable number of patterns derived from the ground-patterns. All the parts of the design must receive the impression of the ground-pattern. I provide a screen similar to $h$ in the foregoing example of the cube placed on such screen. The peripheral lines of the design are traced, and all the parts outside of these lines are darkened or blackened. By placing this screen before the negative of the ground-pattern the latter will be printed on the whole surface of the design. The successively-derived patterns which are employed are now arranged or classified according to the increasing number of the shiftings or displacements and impressions required. It is known that the points of the pattern which require the lowest number of printing operations are also present in the other parts of the drawing or design which require a more considerable number of impressions. This pattern may therefore be transferred upon the design wholly, except upon that part which is intended to receive the impression of the ground-pattern only. It is therefore necessary to provide a film similar to film $j$, which will be placed before the screen and which will screen every part receiving the impression of the ground-pattern only. It is then possible whenever necessary to print the points of the first derived pattern without being obliged to again produce the impression of the points of the ground-pattern.

Let it be supposed, for example, that the following pattern requires two shifting operations and the making of two impressions more than the first. It is remarked that it is not necessary to screen the parts of the design which receive a considerable number of impressions and that it is only required to screen those parts of which there is no further need of impressions—viz., those corresponding to the ground-pattern and the first derived pattern. The first film being left fixed along the edges of the screen and turned down, I turn down a second film, screening only the parts of the design corresponding to the first derived pattern, and, finally, instead of making all the impressions correspond to this second derived pattern it is only necessary to make the two impressions which it comprises exceed the preceding pattern, and so on.

The process consists, therefore, in short, of the following operations: first, to provide a screen on which all the parts outside of the design are blackened; second, to secure along the edges of this screen films screening the parts which correspond to the variously-derived patterns used, these films being arranged according to the increasing number of successive impressions of the patterns; third, to print the ground-pattern through the screen on the whole area of the design and turn down the first film to print the first derived pattern on all the parts which remain uncovered and turn down the second film, the first film being also turned down, the second derived pattern then being printed, and so on.

It is very important to remark that with this process it is not necessary to make for each pattern all the impressions which it comprises, but only the impressions which were not comprised in the preceding pattern. Example: If the fifth derived pattern comprises ten impressions and the sixth thirteen, the transferring of this sixth pattern will not require thirteen printing operations, but only three.

Referring to the screens, it is remarked also that when the fifth pattern is printed it is not necessary to screen with the new film the parts which have received the four preceding patterns, because these films are held in place. It is sufficient for the purpose of making the fifth pattern, to provide a film-screen, the part of the design comprising the fourth pattern.

In short, with the process according to the German Patent No. 73,152 it was necessary, first, to make on glass plates for each part of the design a screen, uncovering this part and screening all the other parts; second, to substitute for each operation one of these screens for another; third, to effect for each pattern the complete series of printing operations.

My present invention or process consists, first, of making on a glass plate a single screen uncovering the whole area of the design; second, of providing for each part a film screening one part and uncovering the other part, said operation being more readily performed than that according to the Patent No. 73,152, consisting of bracing the peripheral lines of the part and darkening the outside of these lines, and, furthermore, the films are not disturbed from the moment they are placed upon the screen; third, of making for each pattern a greatly-reduced number of impressions, because for each pattern the operations which have been effected for the preceding one need not be repeated for the subsequent ones.

It is obvious that instead of employing films secured along the edges of the main screen slender supports may be employed, placed before the screen, provided that these supports be arranged in the same manner as the films and held in place during the entire series of operations.

Having thus fully described my invention, what I claim, and desire to secure by Letters Patent, is—

An improved process of transferring upon cards design-patterns formed of a series of patterns derived from a ground-pattern, consisting of providing a screen upon which is traced the outline or periphery of the design the outer part of this peripheral line being blackened, and said screen being fitted with a series of translucid films upon which are traced and blackened the surfaces corresponding to each derived pattern, said films being arranged according to the increasing number of shifting and printing operations required by the corresponding pattern, said transference being made by printing photographically through said screen the ground-pattern on the whole surface of the design, and then by printing successively the impression from each of the derived patterns not contained in the preceding derived pattern after having folded down upon the screen the successive films, said films remaining before the screen until the completion of the operations, substantially as set forth.

In testimony whereof I have hereunto set my hand in presence of two subscribing witnesses.

PIERRE GUTTON.

Witnesses:
EMILE KLOTZ,
CHARLES OTTENHEIMER.